United States Patent
Honbo

(10) Patent No.: US 7,345,432 B2
(45) Date of Patent: Mar. 18, 2008

(54) INVERTER CIRCUIT FOR LIGHTING BACKLIGHT OF LIQUID CRYSTAL DISPLAY AND METHOD FOR DRIVING THE SAME

(75) Inventor: Nobuaki Honbo, Kanagawa (JP)

(73) Assignee: NEC LCD Technologies, Inc., Kawasaki, Kanagawa (JP)

( * ) Notice: Subject to any disclaimer, the term of this patent is extended or adjusted under 35 U.S.C. 154(b) by 316 days.

(21) Appl. No.: 11/131,231

(22) Filed: May 18, 2005

(65) Prior Publication Data

US 2005/0258783 A1 Nov. 24, 2005

(30) Foreign Application Priority Data

May 20, 2004 (JP) ............................. 2004-150514

(51) Int. Cl.
H05B 41/16 (2006.01)
(52) U.S. Cl. ...................... 315/246; 315/276; 315/291; 315/307; 345/102
(58) Field of Classification Search ............ 315/209 R, 315/246–247, 276, 291, 307–309, 212, 219, 315/282, 287, 297; 345/87, 102, 204, 207
See application file for complete search history.

(56) References Cited

U.S. PATENT DOCUMENTS

| | | | |
|---|---|---|---|
| 6,568,774 B2 * | 5/2003 | Hitzschke et al. .......... | 315/246 |
| 6,680,585 B2 * | 1/2004 | Trestman ..................... | 315/291 |
| 6,809,717 B2 * | 10/2004 | Asao et al. .................. | 345/102 |
| 6,864,644 B2 * | 3/2005 | Kernahan .................... | 315/307 |
| 6,894,675 B2 * | 5/2005 | Bruning et al. ............. | 345/102 |
| 7,285,920 B2 * | 10/2007 | Riederer et al. ............ | 315/246 |
| 2002/0121865 A1 * | 9/2002 | Nakatsuka et al. ... | 315/209 PZ |
| 2005/0012470 A1 * | 1/2005 | Qiu ............................. | 315/291 |
| 2005/0174818 A1 * | 8/2005 | Lin et al. ..................... | 363/98 |

FOREIGN PATENT DOCUMENTS

| | | |
|---|---|---|
| JP | 10-199690 | 7/1998 |
| JP | 11-297485 | 10/1999 |

* cited by examiner

Primary Examiner—Haissa Philogene
Assistant Examiner—Tung X Le
(74) Attorney, Agent, or Firm—McGinn IP Law Group, PLLC

(57) ABSTRACT

A separately-excited inverter circuit includes: an oscillator which generates a high-frequency voltage pulse by mixing a high-frequency voltage pulse of a first frequency and a high-frequency voltage pulse of a second frequency different from the first frequency; and a transformer drive part which buffers an output signal of this oscillator, and inputs the signal to a primary side of a transformer. The inverter circuit includes a capacitor which is connected in parallel with an output of a secondary side of the transformer. When used for lighting the backlight of a liquid crystal display, the present invention can improve the lighting characteristics of the backlight with a long cold-cathode tube.

20 Claims, 9 Drawing Sheets

INVERTER CIRCUIT FOR LIGHTING BACKLIGHT OF LIQUID CRYSTAL DISPLAY AND METHOD FOR DRIVING THE SAME

BACKGROUND OF THE INVENTION

1. Field of the Invention

The present invention relates to an inverter circuit for lighting a backlight of a liquid crystal display (LCD), and a method for driving the same. Particularly, the present invention relates to a separately-excited inverter circuit for lighting a backlight, and a method for driving the same.

2. Description of the Related Art

For lighting the backlight of a liquid crystal display, a separately-excited inverter circuit has been used, which utilizes resonance of a secondary circuit of a transformer. Compared to a self-excited inverter circuit, the separately-excited inverter circuit realizes a brighter backlight at the same input power, and less heat generation by the backlight. Moreover, the separately-excited inverter circuit realizes a smaller transformer, thus obtaining an advantage that the inverter circuit can be miniaturized.

Japanese Patent Laid-open Nos. Hei 11 (1999)-297485, Hei 10 (1998)-199690, and the like disclose examples of such a separately-excited inverter circuit for lighting the backlight of a liquid crystal display. FIG. 1 shows a configuration example of an inverter circuit for a backlight, which is disclosed in Japanese Patent Laid-open No. Hei 11 (1999)-297485. In FIG. 1, a fluorescent tube 101 is a backlight fluorescent tube, which is provided on the back of an unillustrated liquid crystal display panel, and irradiates the liquid crystal display panel from its back. A circuit in a portion surrounded by a broken line indicated by reference numeral 100 is a separately-excited inverter circuit, which is used for lighting the fluorescent tube 101. In this inverter circuit 100, a resonant capacitor C11 is connected to a primary winding N1 of a transformer T1 in parallel therewith. Both ends of the resonant capacitor C11 are connected to collectors of transistors Q11 and Q12, respectively. Emitters of the transistors Q11 and Q12 are grounded. In addition, bases of the transistors Q11 and Q12 are connected to output terminals (not shown) of a drive pulse generator 102, respectively, through input terminals (not shown).

A secondary winding N2 of the transformer T1 is connected to the fluorescent tube 101. Note that one terminal of the secondary winding N2 of the transformer T1 is connected to one electrode terminal of the fluorescent tube 101 through a current-limiting capacitor C12. In this inverter circuit 100, the transistor Q11 and the transistor Q12 are alternately turned on and off according to a drive pulse P1 and a drive pulse P2 from the drive pulse generator 102. Thus, a boosted alternating voltage is generated in the secondary winding N2 of the transformer T1, this alternating voltage causes a current to flow into the fluorescent tube 101 through the current-limiting capacitor C12, and the fluorescent tube 101 is lighted.

In the case of the above-described conventional separately-excited inverter circuit for the backlight of a liquid crystal display, a resonant circuit is formed of a secondary leakage inductance of a transformer, a resonant capacitor, and a stray capacitance of the backlight. The stray capacitance of the backlight has different values between the time when the lighting of the backlight is begun and the time after the lighting becomes stable. A resonance frequency of the resonant circuit also has different values between the time when the lighting of the backlight is begun and the time after the lighting becomes stable.

In terms of lighting characteristics of the backlight, it is preferable to drive the backlight at around the resonance frequency when the lighting is begun. Meanwhile, in terms of a brightness efficiency of the backlight, it is preferable to drive the backlight at the resonance frequency after the lighting has become stable.

The inverter circuit for the backlight is often operated at a single drive frequency. With the emphasis on the brightness efficiency of the backlight, if the backlight is operated at the resonance frequency after the lighting has become stable, there may arise a problem that the backlight is not lighted, and the like. Moreover, with the emphasis on the lighting characteristics of the backlight, if the backlight is driven at the resonance frequency when the lighting is begun, there arises a problem that the brightness efficiency of the backlight is lowered.

In recent years, along with realization of a larger-sized liquid crystal display, a cold-cathode tube of a backlight used therein has become longer. The longer the cold-cathode tube becomes, the more likely a problem that the backlight is not lighted occurs if the backlight is operated at the resonance frequency after the lighting has become stable. When the cold-cathode tube is long, the difference of the resonance frequency of the resonant circuit in the separately-excited inverter circuit becomes large between the time when the lighting is begun and the time after the lighting has become stable. Moreover, a voltage at which lighting of the cold-cathode tube becomes stable also gets higher. Thus, in a case where a long cold-cathode tube is used, it is required to previously set a power-supply voltage to be sufficiently high. In a case where the long cold-cathode tube is used at a single drive frequency, the cold-cathode tube may not be lighted unless there is a sufficient margin in the power-supply voltage in consideration for the inductance of the transformer, the resonant capacitor, and a variation in the stray capacitance.

SUMMARY OF THE INVENTION

Therefore, a typical aspect of the present invention is a separately-excited inverter circuit for lighting a backlight, and a method for driving the same. Specifically, the separately-excited inverter circuit achieves good lighting characteristics and can suppress the lowering of the brightness efficiency of the backlight for a liquid crystal display even if a cold-cathode tube of the backlight becomes longer.

A first configuration of a separately-excited inverter circuit for lighting the backlight of a liquid crystal display of the present invention includes: an oscillator which generates a high-frequency voltage pulse; a transformer; a transformer drive part which buffers an output signal of the oscillator, and inputs the signal to a primary side of the transformer; and a capacitor which is connected to the output of a secondary side of the transformer. The oscillator generates a high-frequency voltage pulse by mixing the high-frequency voltage pulse of a first frequency and the high-frequency voltage pulse of a second frequency different from the first frequency.

In the above-described first configuration of the separately-excited inverter circuit for the backlight of a liquid crystal display of the present invention, it is possible to set that the high-frequency voltage pulse of the first frequency is a high-frequency voltage pulse of a resonance frequency in a stable lighting state of the backlight, and that the high-frequency voltage pulse of the second frequency is the high-frequency voltage pulse of a resonance frequency at the beginning of lighting the backlight.

A second configuration of the separately-excited inverter circuit for the backlight of a liquid crystal display of the present invention, according to the above-described first configuration thereof, further includes: a temperature sensor which detects a temperature around the backlight; and a temperature detection circuit which detects a temperature output signal of the temperature sensor and controls oscillation of the oscillator.

In the above-described second configuration of the separately-excited inverter circuit for the backlight of the liquid crystal display of the present invention, the temperature detection circuit determines, based on the detected temperature output signal, how many periods of the high-frequency voltage pulse of the resonance frequency at the beginning of lighting the backlight are inserted into the high-frequency voltage pulse of the resonance frequency in the stable lighting state of the backlight by the oscillator, and allows the oscillator to generate this determined pulse.

A third configuration of the separately-excited inverter circuit for the backlight of a liquid crystal display of the present invention, according to the above-described first configuration thereof, further includes a timer circuit which is connected to the oscillator and controls a mode of the oscillator in which the high-frequency voltage pulse of the first frequency and the high-frequency voltage pulse of the second frequency are mixed.

A fourth configuration of the separately-excited inverter circuit for the backlight of a liquid crystal display of the present invention, according to the above-described first to third configurations thereof, is characterized in that the backlight has a divided structure.

In the above-described first configuration of the separately-excited inverter circuit for the backlight of a liquid crystal display of the present invention, if the backlight has the divided structure, the oscillator is shared, and circuits which have the same connection structure as that of the transformer drive part, the transformer, and the capacitor can be connected to the divided regions of the backlight, respectively.

In the above-described second configuration of the separately-excited inverter circuit for the backlight of a liquid crystal display of the present invention, if the backlight has the divided structure, the oscillator, the temperature sensor and the temperature detection circuit are shared, and circuits which have the same connection structure as that of the transformer drive part, the transformer, and the capacitor can be connected to the divided regions of the backlight, respectively.

In the above-described third configuration of the separately-excited inverter circuit for the backlight of a liquid crystal display of the present invention, if the backlight has the divided structure, the oscillator and the timer circuit are shared, and circuits which have the same connection structure as that of the transformer drive part, the transformer, and the capacitor can be connected to the divided regions of the backlight, respectively.

A method for driving the separately-excited inverter circuit for the backlight of a liquid crystal display having the first configuration of the present invention as described above includes the steps of: generating, by the oscillator, a high-frequency voltage pulse obtained by inserting predetermined periods of the high-frequency voltage pulse of the resonance frequency at the beginning of lighting the backlight for every predetermined period of the high-frequency voltage pulse of the resonance frequency in the stable lighting state of the backlight; and driving the inverter circuit.

A method for driving the separately-excited inverter circuit for the backlight of a liquid crystal display having the second configuration of the present invention as described above includes the steps of: comparing a temperature detected by the temperature sensor with a preset temperature; and controlling periods of the high-frequency voltage pulse of the resonance frequency at the beginning of lighting the backlight, which will be inserted into predetermined periods of the high-frequency voltage pulse of the resonance frequency in the stable lighting state of the backlight.

A method for driving the separately-excited inverter circuit for the backlight of a liquid crystal display having the third configuration of the present invention as described above includes the steps of: operating the timer circuit from the beginning of lighting the backlight; and reducing, as the time of the lighting passes, inserted periods of the high-frequency voltage pulse of the resonance frequency at the beginning of the lighting, by use of the timer circuit.

The separately-excited inverter circuit for the backlight of a liquid crystal display having the first configuration of the present invention as described above is driven by inserting several periods of the high-frequency voltage pulse of the resonance frequency at the beginning of the lighting into predetermined periods of the high-frequency voltage pulse of the resonance frequency after the lighting of the backlight has become stable. Thus, the lowering of the brightness efficiency of the backlight is suppressed, and the lighting characteristics of the backlight can be improved even if a cold-cathode tube of the backlight becomes longer.

The separately-excited inverter circuit for the backlight of a liquid crystal display having the second configuration of the present invention as described above, in addition to the above-described first configuration of the present invention, further includes: a temperature sensor which detects a temperature around the backlight; and a temperature detection circuit which detects a temperature output signal of the temperature sensor and controls oscillation of the oscillator. By use of the temperature sensor and the temperature detection circuit, when the temperature around the backlight is low, the inverter circuit is driven by increasing the number of inserted periods of the high-frequency voltage pulse of the resonance frequency at the beginning of the lighting. Thus, even if the temperature around the backlight is low, the lighting characteristics of the backlight are not lowered.

The separately-excited inverter circuit for the backlight of a liquid crystal display having the third configuration of the present invention described above, in addition to the above-described first configuration of the present invention, further includes a timer circuit which is connected to the oscillator. This timer circuit controls a mode of the oscillator in which the high-frequency voltage pulse of the first frequency and the high-frequency voltage pulse of the second frequency are mixed. By use of this timer circuit, the number of inserted pulses of the resonance frequency at the beginning of the lighting is increased when the lighting is begun, and the number of inserted pulses is reduced as the time of the lighting passes. Thus, the lowering of the brightness efficiency of the backlight is further suppressed, and the lighting characteristics of the backlight can be improved.

The separately-excited inverter circuit for the backlight of a liquid crystal display having the first to third configurations of the present invention as described above is applicable even when the backlight is divided.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Next, with reference to the drawings, exemplary embodiments of the present invention will be described.

Figure 1:
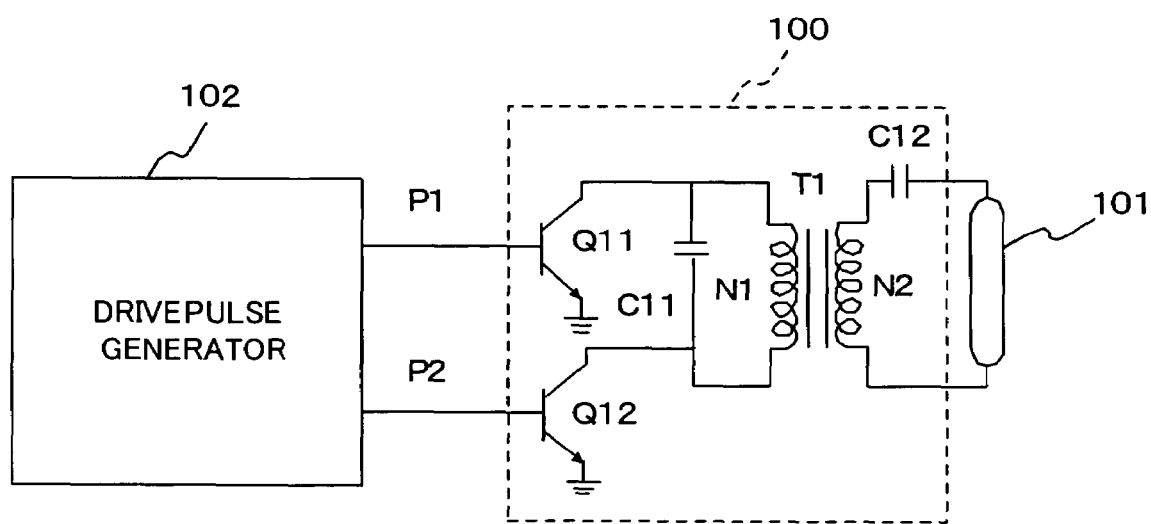
FIG. 1 is a block diagram showing a configuration example of a conventional separately-excited inverter circuit for lighting the backlight of a liquid crystal display.
Figure 2:
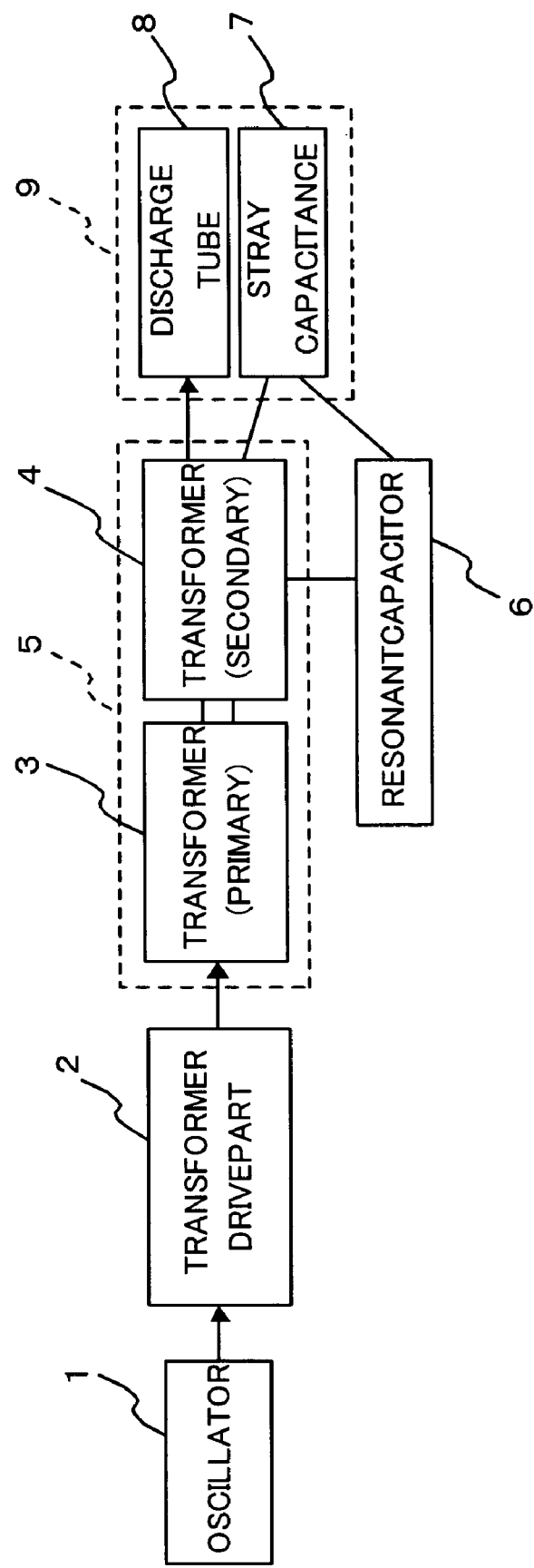
FIG. 2 is a block diagram showing a configuration of an inverter circuit according to a first exemplary embodiment of the present invention.

FIG. 2 is a block diagram of a separately-excited inverter circuit for the backlight of a liquid crystal display according to a first embodiment of the present invention. With reference to FIG. 2, the inverter circuit of the present invention includes an oscillator 1, a transformer 5, a transformer drive part 2, and a resonant capacitor 6. The oscillator 1 performs oscillation by mixing a high-frequency voltage pulse of a first frequency and a high-frequency voltage pulse of a second frequency different from the first frequency. The transformer 5 is formed of a primary side 3 having a primary winding, and a secondary side 4 having a secondary winding. The resonant capacitor 6 is connected to an output of the secondary side 4 of the transformer 5 in parallel therewith.

The oscillator 1 has a function capable of changing an oscillation frequency, and can change a predetermined period of the high-frequency voltage pulse of the first frequency, and a period of the high-frequency voltage pulse of the second frequency, which is inserted thereto. The oscillator 1 may have any configuration as long as the oscillation frequency can be changed. For example, if a voltage controlled oscillator (VCO) is used, the oscillator can have a configuration in which a voltage to be inputted to the VCO can be changed by a signal from a timer circuit.

The oscillator 1 has a function capable of changing the predetermined period of the high-frequency voltage pulse of the first frequency, and the period of the high-frequency voltage pulse of the second frequency, which is inserted thereto. For example, as the high-frequency voltage pulse of the first frequency, there is a high-frequency voltage pulse of a resonance frequency in a stable lighting state. Meanwhile, as the high-frequency voltage pulse of the second frequency, there is a high-frequency voltage pulse of a resonance frequency at the beginning of the lighting. The transformer drive part 2 includes a push-pull circuit and a level shifter circuit having a function of converting an output signal of the oscillator into a voltage level sufficient for driving a buffer. Note that the function of the transformer drive part 2 can also be included in the oscillator 1.

An output terminal of the secondary side 4 of the transformer 5 is connected to a discharge tube 8 of a backlight 9. As the discharge tube 8, a cold-cathode tube is used.

In the inverter circuit of the present invention, a resonant circuit is formed by use of the leakage component of the secondary side 4 of the transformer 5, the resonant capacitor 6, and a stray capacitance 7 of the backlight 9.

Next, with reference to the drawings, description will be given of a method for driving the inverter circuit shown in FIG. 2.

First, a high-frequency voltage pulse is generated by the oscillator 1 in such a manner that a resonance frequency pulse at the beginning of the lighting is mixed into a resonance frequency pulse in the stable lighting state only for a predetermined period. Thereafter, the pulse is inputted to the primary side 3 of the transformer 5 in the inverter circuit. Subsequently, a resonant circuit is formed by use of a leakage component of the secondary side 4 of the transformer 5, the resonant capacitor 6, and the stray capacitance 7 of the backlight 9. By use of this resonant circuit, the high-frequency voltage pulse inputted to the primary side 3 of the transformer 5 is outputted to the secondary side 4 of the transformer 5, and the discharge tube 8 is lighted.

Figure 3:
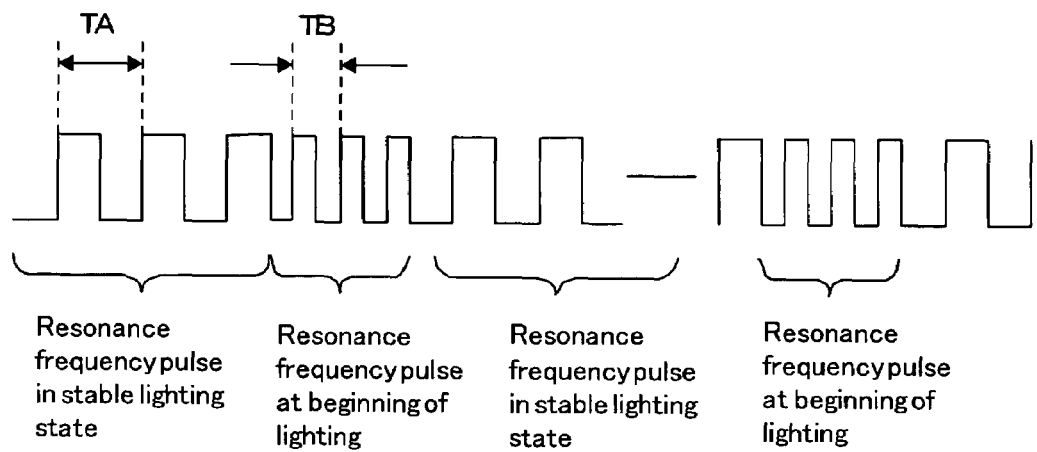
FIG. 3 is a waveform diagram showing a voltage waveform of a transformer drive pulse of the inverter circuit, which is oscillated by an oscillator shown in FIG. 2.

FIG. 3 shows an example of a voltage waveform of the drive pulse described above. FIG. 3 shows that the resonance frequency pulse at the beginning of the lighting is inserted into the resonance frequency pulse in the stable lighting state for 3 periods. Note that the stable lighting state means a state where the entire cold-cathode tube used for the backlight is lighted, a predetermined tube current flows into the cold-cathode tube, and a temperature is also stabilized. A symbol TA denotes 1 period of the resonance frequency pulse in the stable lighting state, and the symbol TB denotes 1 period of the resonance frequency pulse at the beginning of the lighting. In FIG. 3, the period of the resonance frequency in the stable lighting state is set to be 3 periods, as a model, in order to facilitate understanding thereof. In reality, about 1 to 10 periods of the resonance frequency pulse at the beginning of the lighting are inserted into 100 to 200 Hz of the resonance frequency pulse in the stable lighting state.

The stray capacitance of the backlight 9 has different values between the beginning of the lighting and the time when the lighting is stable. Assuming that a value of the stray capacitance of the backlight 9 in the stable lighting state is CA, the leakage inductance of the secondary side 4 of the transformer 5 is L, and a capacitance value of a resonant capacitor is C, a resonance frequency FA is expressed by the following equation (1).

$$FA = 1/(2 \times \pi \times (L \times (C+CA))^{1/2}) \tag{1}$$

Moreover, assuming that the stray capacitance of the backlight 9 at the beginning of the lighting is CB, the leakage inductance of the secondary side 4 of the transformer 5 is L, and the capacitance value of the resonant capacitor is C, a resonance frequency FB is expressed by the following equation (2).

$$FB=1/(2\times\pi\times(L\times(C+CB))^{1/2}) \quad (2)$$

The stray capacitance of the backlight is larger in the stable lighting state than at the beginning of the lighting. Therefore, FB>FA is established from the above-described equations (1) and (2). Specifically, in FIG. 3, TA>TB is established.

Figure 4:
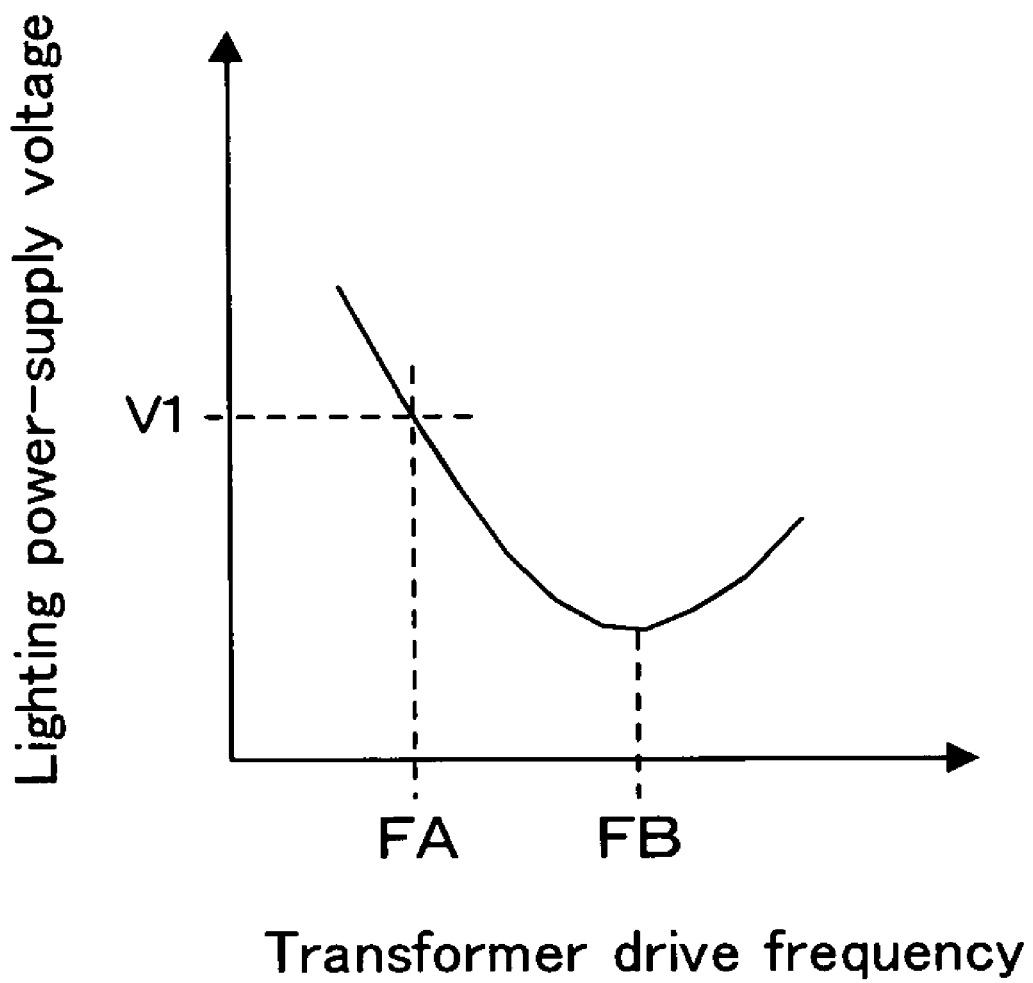
FIG. 4 is a characteristic diagram showing a relationship between a transformer drive frequency of the inverter circuit and a lighting power-supply voltage of a cold-cathode tube of the backlight.

FIG. 4 shows a power-supply voltage at which the lighting of the cold-cathode tube used for the backlight is begun at a transformer drive frequency. The resonance frequency FB at the beginning of the lighting leads to the lowest voltage at which the lighting is begun. Thus, the good lighting characteristics are achieved.

Figure 6:
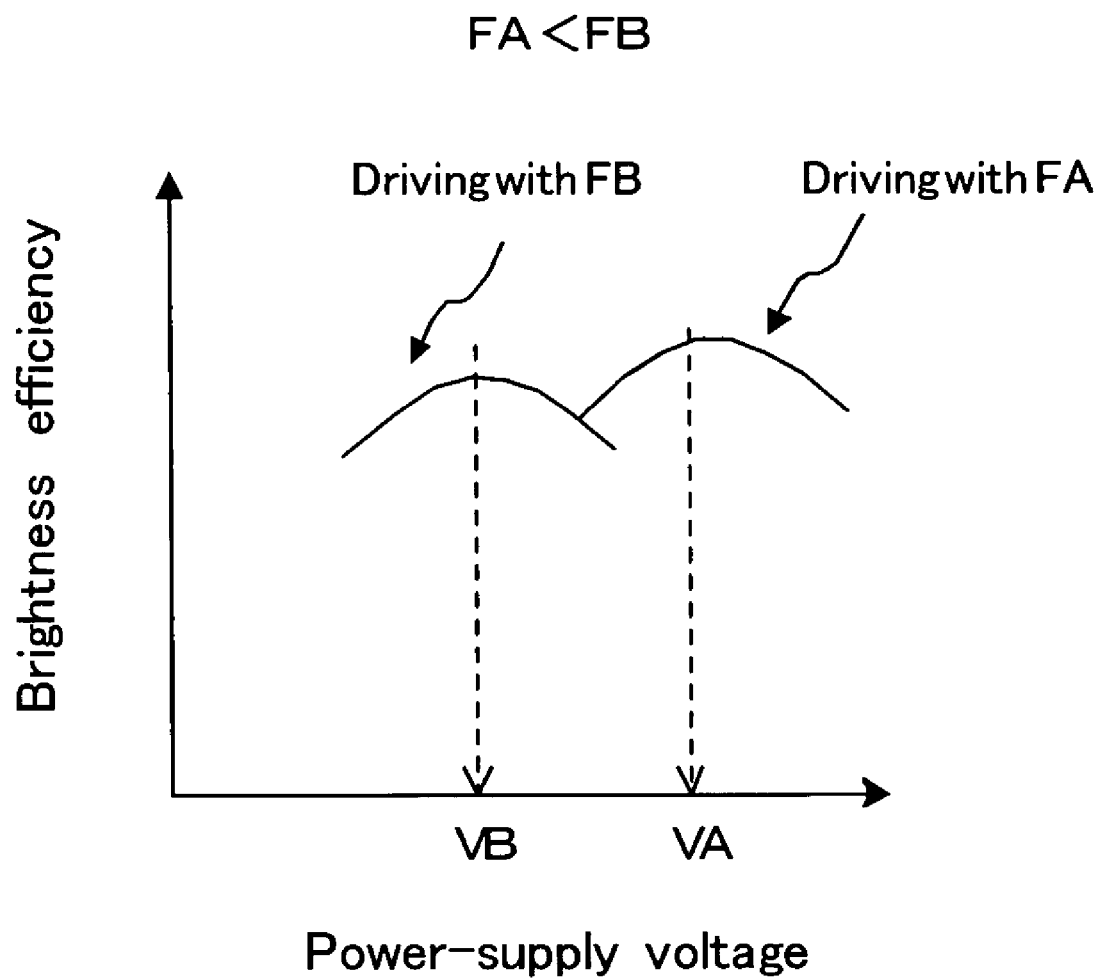
FIG. 6 is a characteristic diagram showing a relationship between the power-supply voltage and a brightness efficiency of the backlight.

FIG. 6 shows a relationship between the power-supply voltage and a brightness efficiency of the backlight. With reference to FIG. 6, the brightness efficiency of the backlight is better when the backlight is driven at the resonance frequency FA in the stable lighting state than when the backlight is driven at the resonance frequency FB at the beginning of the lighting. Therefore, in order to efficiently operate the backlight, it is preferable to light the backlight at the resonance frequency FA in the stable lighting state.

The longer the cold-cathode tube becomes, the more likely a problem that the backlight is not lighted occurs if the backlight is operated at a resonance frequency after lighting has become stable. When the cold-cathode tube is long, the resonance frequency of the resonant circuit in the separately-excited inverter circuit greatly differs between the time when the lighting is begun and the time after the lighting has become stable. Moreover, a voltage at which lighting becomes stable also gets higher. Thus, in the case where a long cold-cathode tube is used, it is required to previously set the power-supply voltage to be sufficiently high. In a case where the long cold-cathode tube is used at a single drive frequency, the cold-cathode tube may not be lighted unless there is a sufficient margin in the power-supply voltage in consideration for the inductance of the transformer, the resonant capacitor, and a variation in the stray capacitance.

Figure 5:
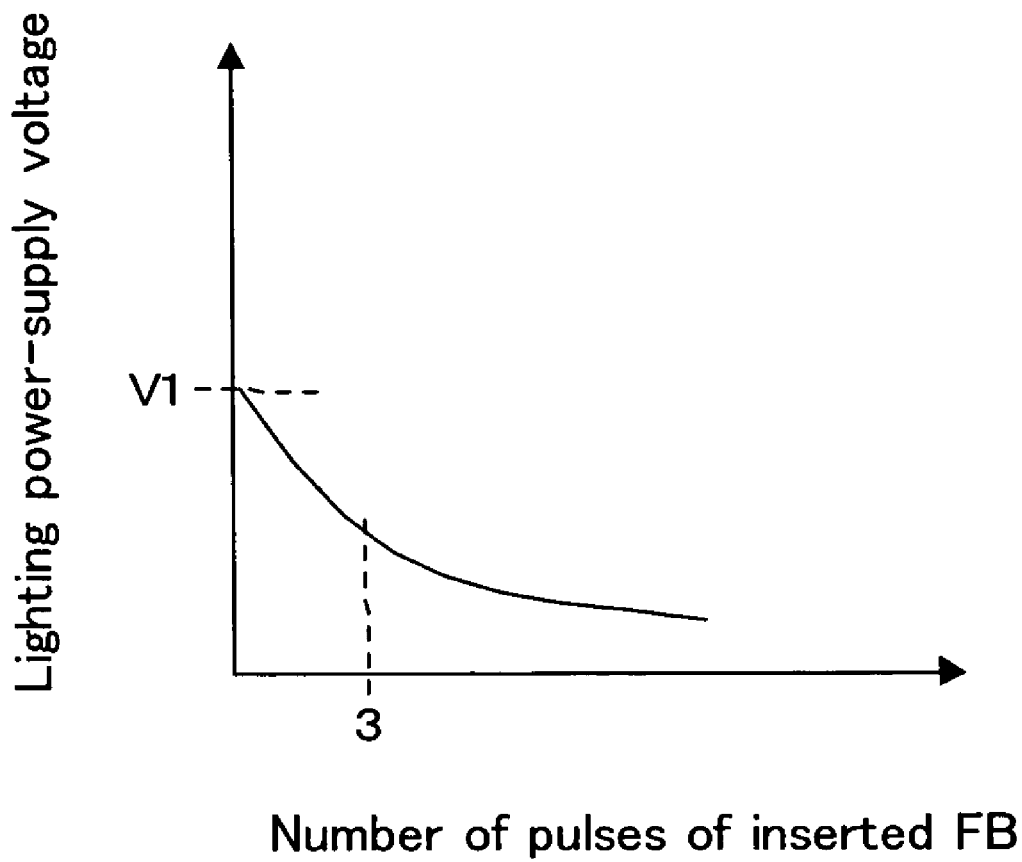
FIG. 5 is a characteristic-diagram showing a relationship between the number of pulses obtained by inserting a resonance frequency pulse at the beginning of the lighting to a resonance frequency pulse in a stable lighting state and the lighting power-supply voltage of the cold-cathode tube.

As in the case of FIG. 3, FIG. 5 shows a power-supply voltage at which the lighting of the cold-cathode tube is begun when a pulse of the resonance frequency FB at the beginning of the lighting is inserted into a pulse of the resonance frequency FA in the stable lighting state. VB and VA in FIG. 5 indicate power-supply voltages at which the brightness efficiency of the backlight reaches its maximum when the cold-cathode tube is lighted at each of the resonance frequencies FB and FA. When FB is inserted for about 3 periods, the power-supply voltage at which the lighting is begun becomes less than half that when no FB is inserted. Accordingly, the lighting characteristics are improved. The reason that the lighting characteristics are improved is because of a change in the resonance frequency between the beginning of the lighting and the time when the lighting is stable, and the characteristics of the cold-cathode tube. The resonance frequency is higher at the beginning of the lighting than the time when the lighting is stable. For example, more currents flow into the cold-cathode tube in driving with FB described above than in driving with FA. Moreover, the cold-cathode tube has a negative resistance characteristic, which causes a tube voltage to drop when a predetermined tube current flows. Therefore, while the frequency pulse of FB is applied, the predetermined tube current flows. Thus, the lighting characteristics are improved. Moreover, since insertion of the frequency pulse of FB is carried out for several periods, there is less lowering of the brightness efficiency. For example, in the case of a backlight in which FA is 60 kHz and FB is 100 kHz, when 3 periods of FB are inserted for every 200 Hz period of FA, 6% of FB is inserted into a wave form applied to the cold-cathode tube. In this case, the lowering of the brightness efficiency is about 2% or less. Thus, it is found out that there is less lowering of the efficiency.

Next, with reference to FIG. 7, description will be given of an inverter circuit according to a second exemplary embodiment of the present invention. The inverter circuit of this embodiment has a configuration in which a temperature sensor and a temperature detection circuit are provided in the inverter circuit shown in FIG. 2.

Figure 7:
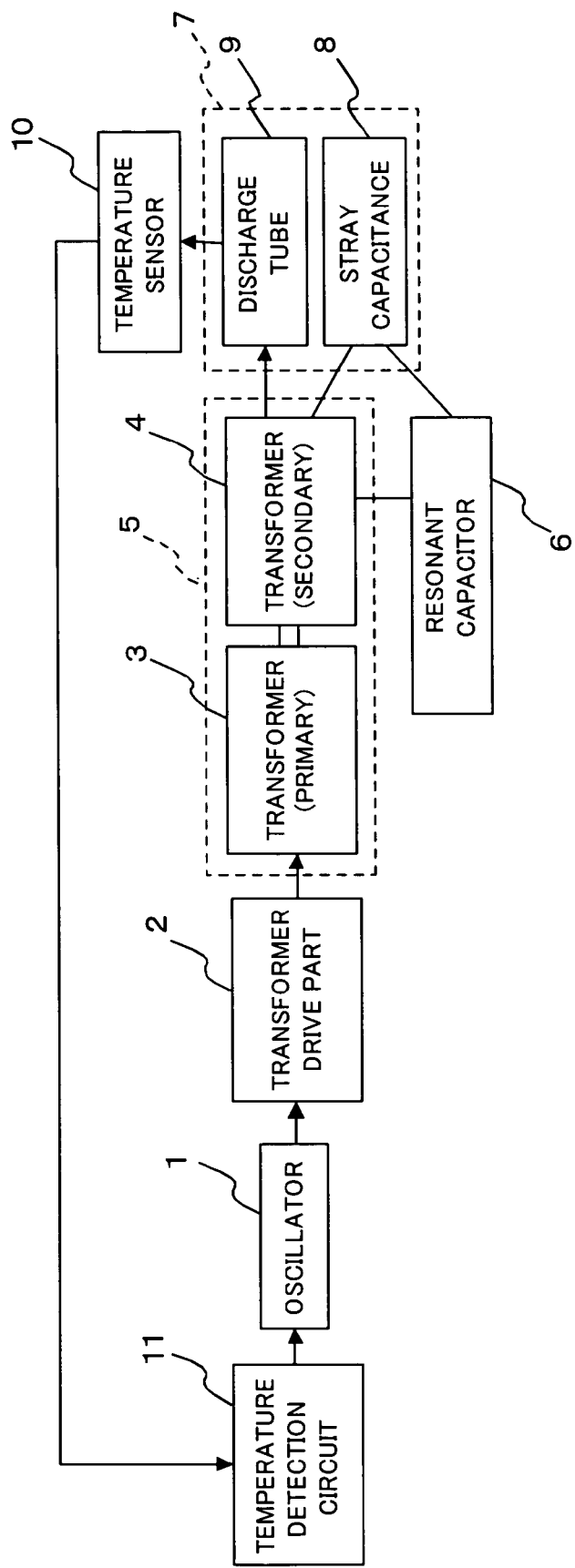
FIG. 7 is a block diagram showing a configuration of an inverter circuit according to a second exemplary embodiment of the present invention.

With reference to FIG. 7, the inverter circuit of this embodiment includes an oscillator 1, a transformer 5, and a resonant capacitor 6. The transformer 5 is formed of a primary side 3 having a primary winding, and a secondary side 4 having a secondary winding. The resonant capacitor 6 is connected to an output of the secondary side 4 of the transformer 5 in parallel therewith. The oscillator 1 has the same function as that of the oscillator in the inverter circuit of the first embodiment of the present invention as described above. Specifically, the oscillator 1 has a function of performing oscillation by mixing only a predetermined period of a high-frequency voltage pulse of a resonance frequency at the beginning of the lighting into a predetermined period of a high-frequency voltage pulse of a resonance frequency in the stable lighting state.

An output terminal of the secondary side 4 of the transformer 5 is connected to a discharge tube 8 of a backlight 9. As the discharge tube 8, a cold-cathode tube is used. The inverter circuit of this embodiment includes: a temperature sensor 10 which detects a temperature around the backlight 9; and a temperature detection circuit 11 which is connected to the temperature sensor 10, detects an output signal of the temperature sensor 10, and controls oscillation of the oscillator 1. Note that, as the temperature sensor 10, a thermistor can be used. Moreover, besides the thermistor, a thermocouple, a platinum resistance thermometer sensor, and the like can be used as the temperature sensor 10.

The temperature detection circuit 11 determines, based on the detected output signal of the temperature sensor 10, how many periods of pulses of a resonance frequency FB at the beginning of the lighting are inserted into pulses of a resonance frequency FA in the stable lighting state by the oscillator 1. Thereafter, the temperature detection circuit 11 sends out this signal to the oscillator 1. Upon receipt of the signal from the temperature detection circuit 11, the oscillator 1 generates a high-frequency voltage pulse obtained by inserting the determined periods of pulses of the resonance frequency FB at the beginning of the lighting into the determined period of pulses of the resonance frequency FA in the stable lighting state. The temperature detection circuit 11 performs a control so as to increase the number of pulses of the resonance frequency FB at the beginning of the lighting when a temperature of the backlight is low, such as at the beginning of the lighting, and to reduce the number of pulses of the resonance frequency FB at the beginning of the lighting when the temperature around the backlight 9 rises above a predetermined temperature.

When a pulse is inputted to the primary side 3 of the transformer 5, a resonant circuit is formed by use of the leakage component of the secondary side 4 of the transformer 5, the resonant capacitor 6, and a stray capacitance 7 of the backlight 9. By use of this resonant circuit, the high-frequency voltage pulse inputted to the primary side 3 of the transformer 5 is outputted to the secondary side 4 of the transformer 5, and the discharge tube 8 is lighted.

In the inverter circuit of this embodiment, as described above, the temperature around the backlight 9 is detected by the temperature sensor 10, and the pulse generated by the oscillator 1 can be controlled by the temperature detection circuit 11 in consideration of the temperature around the backlight 9. Thus, lighting characteristics at low temperatures are also improved.

Note that the operations of the inverter circuit of this embodiment are the same as those of the inverter circuit of the first embodiment of the present invention as described above, except for the operations of the temperature sensor 10 and the temperature detection circuit 11. Thus, description thereof will be omitted.

Next, with reference to FIG. 8, description will be given of an inverter circuit according to a third exemplary embodiment of the present invention. The inverter circuit of this embodiment has a configuration in which a timer circuit is provided in the inverter circuit shown in FIG. 2.

Figure 8:
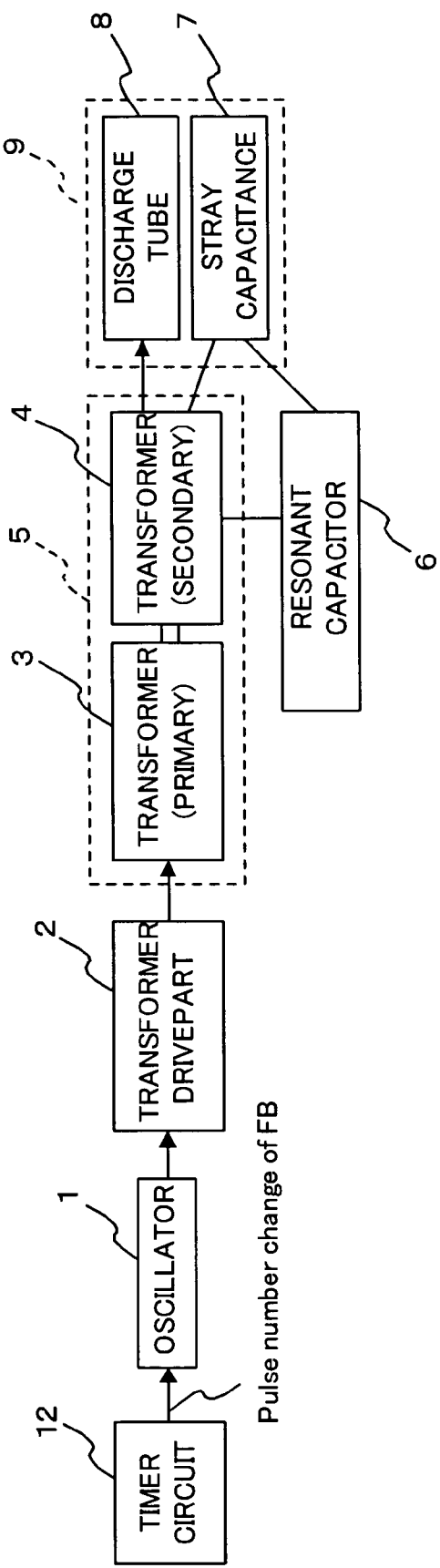
FIG. 8 is a block diagram showing a configuration of an inverter circuit according to a third exemplary embodiment of the present invention.

With reference to FIG. 8, the inverter circuit of this embodiment includes: an oscillator 1; a transformer 5; a transformer drive part 2 which buffers an output signal of the oscillator 1 and inputs the signal to a primary side 3 of the transformer 5; and a resonant capacitor 6 which is connected to an output of a secondary side 4 of the transformer 5 in parallel therewith.

The oscillator 1 has the same function as that of the oscillator in the inverter circuit of the first embodiment of the present invention as described above. Specifically, the oscillator 1 has a function of performing oscillation by mixing only a predetermined period of the high-frequency voltage pulse of a resonance frequency at the beginning of the lighting into a predetermined period of a high-frequency voltage pulse of a resonance frequency in the stable lighting state. An output terminal of the secondary side 4 of the transformer 5 is connected to a discharge tube 8 of a backlight 9. As the discharge tube 8, a cold-cathode tube is used.

The inverter circuit of this embodiment includes a timer circuit 12 which is connected to the oscillator 1. The oscillator 1 performs oscillation by mixing only predetermined periods of pulses of a resonance frequency FB at the beginning of the lighting into a resonance frequency FA in a stable lighting state. Meanwhile, the timer circuit 12 determines how many pulses of this resonance frequency FB are inserted, and when the pulses thereof are inserted. The timer circuit 12 starts to operate from the beginning of the lighting, and controls the oscillator 1 so as to increase the number of inserted pulses of the resonance frequency FB at the beginning of the lighting. For example, in the case of a backlight which measures about 20 inches in width, it takes about 30 minutes to stabilize a temperature of the backlight from the beginning of lighting the cold-cathode tube. During this time, about 5 periods of FB are inserted at intervals of 250 Hz, and, thereafter, 1 period thereof is inserted at intervals of 250 Hz. Alternatively, the insertion of FB can be performed in such a manner that 10 periods are inserted immediately after the beginning of the lighting, the number of pulses inserted is gradually reduced as the time of the lighting passes, and 1 period is inserted after 30 minutes. The timer circuit 12 controls the oscillator 1 so as to reduce the number of pulses of the resonance frequency FB at the beginning of the lighting as the time of the lighting passes.

When a pulse is inputted to the primary side 3 of the transformer 5, a resonant circuit is formed by use of the leakage component of the secondary side 4 of the transformer 5, the capacitor 6, and a stray capacitance 7 of the backlight 9. By use of this resonant circuit, the high-frequency voltage pulse inputted to the primary side 3 of the transformer 5 is outputted to the secondary side 4 of the transformer 5, and the discharge tube 8 is lighted.

In the inverter circuit of this embodiment, many resonance frequency pulses at the beginning of the lighting can be applied at the beginning of the lighting. Thus, the lighting characteristics are improved compared to the inverter circuit of the first embodiment of the present invention described above. Moreover, many resonance frequency pulses in the stable lighting state can be applied after the lighting has become stable. Thus, the lowering of the brightness efficiency of the backlight is also less than that in the inverter circuit of the first embodiment of the present invention described above.

Note that operations of the inverter circuit of this embodiment are the same as those of the inverter circuit of the first embodiment of the present invention as described above, except for the operation of the timer circuit 12. Thus, description thereof will be omitted.

Next, with reference to FIG. 9, description will be given of an inverter circuit according to a fourth exemplary embodiment of the present invention. The inverter circuit of this embodiment is used when a backlight is divided (the backlight is formed of several cold-cathode tube blocks) and constantly lighted to display a still image. As a method for improving display of moving images on an LCD, there is a method for sequentially blinking a backlight. The inverter circuit of this embodiment can be used when a backlight for sequential blinking is driven so as to be constantly lighted for preventing flicker and the like and a still image is displayed.

Figure 9:
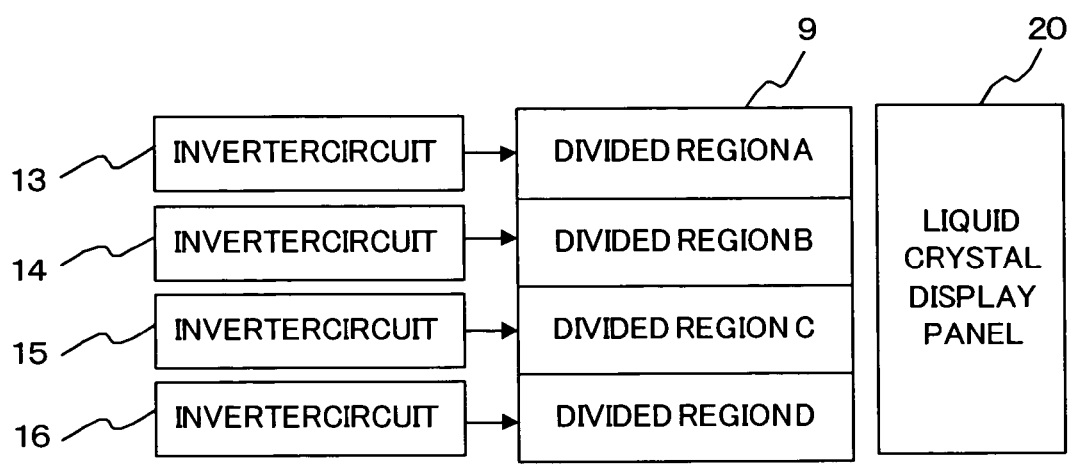
FIG. 9 is a block diagram showing a configuration of an inverter circuit according to a fourth exemplary embodiment of the present invention.

With reference to FIG. 9, the circuit of this embodiment includes a plurality of inverter circuits which are connected to each divided region of a backlight 9. In FIG. 9, as an example, the backlight 9 is divided into four regions (indicated by divided regions A to D), and four inverter circuits (indicated by inverter circuits 13 to 16) are connected to each divided region of the backlight 9. The inverter circuits 13 to 16 may be any of the inverter circuits shown in FIGS. 2, 7 and 8. Note that reference numeral 20 in FIG. 9 denotes a liquid crystal display panel.

When the inverter circuit shown in FIG. 2 is used as the inverter circuits 13 to 16, an oscillator 1 is shared, and a transformer drive part 2, a transformer 5, and a resonant capacitor 6 may be provided in each of the inverter circuits 13 to 16. Moreover, if the inverter circuit shown in FIG. 7 is used, the oscillator 1 and a temperature detection circuit 11 are shared, and the transformer drive part 2, the transformer 5, and the capacitor 6 may be provided in each of the inverter circuits 13 to 16.

If the inverter circuit shown in FIG. 8 is used, the oscillator 1 and a timer circuit 12 are shared, and the transformer drive part 2, the transformer 5, and the resonant capacitor 6 may be provided in each of the inverter circuits 13 to 16.

In the inverter circuit of this embodiment, even if the backlight is divided into each block and lighted, the lighting characteristics are improved, and the brightness efficiency is not lowered.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A separately-excited inverter circuit for a backlight of a liquid crystal display, comprising:
   an oscillator generating a high-frequency voltage pulse by mixing a high-frequency voltage pulse of a first frequency and a high-frequency voltage pulse of a second frequency different from the first frequency;
   a transformer drive part connected to the oscillator for buffering an output signal of the oscillator;
   a transformer connected to the transformer drive part to receive a signal therefrom; and
   a capacitor connected to a secondary side of the transformer.

2. The separately-excited inverter circuit for the backlight of the liquid crystal display according to claim 1, wherein the high-frequency voltage pulse of the first frequency is a high-frequency voltage pulse of a resonance frequency in a stable lighting state of the backlight, and the high-frequency voltage pulse of the second frequency is a high-frequency voltage pulse of a resonance frequency at a beginning of lighting the backlight.

3. The separately-excited inverter circuit for the backlight of the liquid crystal display according to claim 1, further comprising:
   a temperature sensor which detects a temperature around the backlight; and
   a temperature detection circuit which detects a temperature output signal of the temperature sensor and controls an oscillation of the oscillator.

4. The separately-excited inverter circuit for the backlight of the liquid crystal display according to claim 3, wherein the temperature detection circuit determines, based on the detected temperature output signal, how many periods of the high-frequency voltage pulse of a resonance frequency at a beginning of lighting the backlight are inserted into the high-frequency voltage pulse of a resonance frequency in a stable lighting state of the backlight by the oscillator, and allows the oscillator to generate the determined high-frequency voltage pulse.

5. The separately-excited inverter circuit for the backlight of the liquid crystal display, according to claim 3, wherein the temperature sensor is one selected from a thermistor, a thermocouple, and a platinum resistance thermometer sensor.

6. The separately-excited inverter circuit for the backlight of the liquid crystal display, according to claim 3, wherein the backlight has a divided structure, the oscillator, the temperature sensor and the temperature detection circuit are shared, and circuits which have the same connection structure as that of the transformer drive part, the transformer, and the capacitor are connected to the divided regions of the backlight, respectively.

7. The separately-excited inverter circuit for the backlight of the liquid crystal display, according to claim 1, further comprising:
   a timer circuit which is connected to the oscillator and controls a mode of the oscillator in which the high-frequency voltage pulse of the first frequency and the high-frequency voltage pulse of the second frequency are mixed.

8. The separately-excited inverter circuit for the backlight of the liquid crystal display, according to claim 7, wherein the backlight has a divided structure, the oscillator and the timer circuit are shared, and circuits, each having the same connection structure as that of the transformer drive part, the transformer, and the capacitor, are connected to divided regions of the backlight, respectively.

9. The separately-excited inverter circuit for the backlight of the liquid crystal display, according to claim 1, wherein the backlight has a divided structure, the oscillator is shared, and circuits which have the same connection structure as that of the transformer drive part, the transformer, and the capacitor are connected to the divided regions of the backlight, respectively.

10. A method for driving a backlight of a liquid crystal display, said method comprising:
    generating, by an oscillator, a high-frequency voltage pulse obtained by inserting predetermined periods of a high-frequency voltage pulse of a resonance frequency at a beginning of lighting the backlight for every predetermined period of the high-frequency voltage pulse of the resonance frequency in a stable lighting state of the backlight; and
    driving the transformer.

11. The method according to claim 10, further comprising:
    comparing a temperature detected by a temperature sensor with a preset temperature; and
    controlling periods of the high-frequency voltage pulse of the resonance frequency at the beginning of the lighting, which will be inserted into predetermined periods of the high-frequency voltage pulse of the resonance frequency in the stable lighting state.

12. The method according to claim 11, further comprising:
    operating a timer circuit from the beginning of lighting the backlight; and
    reducing inserted periods of the high-frequency voltage pulse of the resonance frequency at the beginning of the lighting by use of the timer circuit as the time of the lighting passes.

13. A liquid crystal display, comprising:
    a backlight; and
    a separately-excited inverter circuit that provides high-frequency pulses to drive said backlight,
    wherein said separately-excited inverter circuit generates said high-frequency voltage pulses by mixing high-frequency voltage pulses of a first frequency and high-frequency voltage pulses of a second frequency different from the first frequency.

14. The liquid crystal display of claim 13, wherein the high-frequency voltage pulse of the first frequency comprises a high-frequency voltage pulse of a resonance frequency in a stable lighting state of the backlight, and the high-frequency voltage pulse of the second frequency comprises a high-frequency voltage pulse of a resonance frequency at a beginning of lighting the backlight.

15. The liquid crystal display of claim 13, further comprising:
    a temperature sensor which detects a temperature around the backlight; and
    a temperature detection circuit which detects a temperature output signal of the temperature sensor and controls an oscillation of an oscillator in said separately-excited inverter circuit.

16. The liquid crystal display according to claim 15, wherein the temperature detection circuit determines, based on the detected temperature output signal, how many periods of a high-frequency voltage pulse of a resonance frequency at a beginning of lighting the backlight are inserted into high-frequency voltage pulses of a resonance frequency in a stable lighting state of the backlight, and allows the oscillator to generate the determined high-frequency voltage pulses.

17. The liquid crystal display according to claim 15, wherein the temperature sensor is one selected from a thermistor, a thermocouple, and a platinum resistance thermometer sensor.

18. The liquid crystal display according to claim 13, further comprising:
  a timer circuit connected to an oscillator in said separately-excited inverter circuit, said timer circuit controlling a mode of the oscillator in which the high-frequency voltage pulse of the first frequency and the high-frequency voltage pulse of the second frequency are mixed.

19. The liquid crystal display according to claim 13, wherein said separately-excited inverter circuit comprises:
  an oscillator generating said high-frequency voltage pulses;
  a transformer drive part connected to the oscillator for buffering an output signal of the oscillator;
  a transformer connected to the transformer drive part to receive a signal therefrom; and
  a capacitor connected to a secondary side of the transformer,
  wherein the backlight has a divided structure and the oscillator is shared, and circuits which have a same connection structure as that of the transformer drive part, the transformer, and the capacitor are connected to the divided regions of the backlight, respectively.

20. The liquid crystal display according to claim 19, further comprising:
  a temperature sensor which detects a temperature around the backlight; and
  a temperature detection circuit which detects a temperature output signal of the temperature sensor and controls an oscillation of an oscillator in said separately-excited inverter circuit,
  wherein the temperature sensor and the temperature detection circuit are shared.

* * * * *